United States Patent
Aramburu et al.

(10) Patent No.: US 6,811,122 B2
(45) Date of Patent: Nov. 2, 2004

(54) FLAME ARRESTOR TO COVER AIRCRAFT ENGINES

(75) Inventors: Joseba Aramburu, Miñano (ES); Ernesto Saenz, Miñano (ES); A. Rosa Torres, Miñano (ES); Ivan Villalva, Mñano (ES)

(73) Assignee: Gamesa Desarrollos Aeronauticos SA., Miñano (ES)

( * ) Notice: Subject to any disclaimer, the term of this patent is extended or adjusted under 35 U.S.C. 154(b) by 0 days.

(21) Appl. No.: 10/201,763

(22) Filed: Jul. 23, 2002

(65) Prior Publication Data

US 2003/0014963 A1 Jan. 23, 2003

(30) Foreign Application Priority Data

Jul. 23, 2001 (ES) .......................................... 200101724

(51) Int. Cl.[7] .................................................. B64C 1/00
(52) U.S. Cl. .................................. 244/131; 60/39.11
(58) Field of Search .............................. 244/1 R, 53 R, 244/131; 431/328, 346; 60/39.11; 123/179.25, 184.34, 572, 198 D, 184.53

(56) References Cited

U.S. PATENT DOCUMENTS 1,826,487 A * 10/1931 Wiggins
3,287,094 A * 11/1966 Brownell
3,313,281 A * 4/1967 Schneider
3,796,180 A 3/1974 Ebbighausen ................ 114/211
5,072,704 A * 12/1991 Webb
5,203,296 A 4/1993 Hart ............................ 123/198
5,709,187 A * 1/1998 Jaeger et al.

FOREIGN PATENT DOCUMENTS

GB          284930        12/1932
WO      WO 00/73701 A1   12/2000  ........... F23D/14/82

* cited by examiner

*Primary Examiner*—Tien Dinh
(74) *Attorney, Agent, or Firm*—J. Sanchelima; A. Bordas

(57) ABSTRACT

Flame arrestor to cover aircraft engines made up of one ventilation wire grid (6), one upper metallic plate (9) where wire grid sits (6) on the edges of a circular hole (10) and a wall (25) which is located next to a chamfer (26) placed at the edge of a central hole (5) existing in the platform (3). On the lower side of the thin composite wall (25) there is a flange cylinder formed by a disc (15) a cylindrical ring (14) coinciding in height with the chamfer (26), creating an interior cavity (27) where gases are conducted and accumulated. All these elements are joined together by some bolts (22) that go through them and finish with a lower metallic plate (12) and an octagonal shaped part (19) separated by a specific distance established by the appropriate elements like bushing or spacer.

6 Claims, 2 Drawing Sheets

FLAME ARRESTOR TO COVER AIRCRAFT ENGINES

SUMMARY

As its own name shows, this invention refers to a plate that impedes fire propagation toward the exterior of the compartment that covers, being these compartments placed where the aircraft engines as well as auxiliary power units are located. The new plate constitutive platform is made of composite material and it includes new light and resistant materials in the ventilation wire grid zone, whose disposition with, avoids fire propagation from the interior compartment where the engine is placed toward the rest of the aircraft.

BACKGROUND OF THE INVENTION

The use of other kinds of flame arrestors for different purposes is well known at the current technical stage. Amongst all obtained patents, the following should be highlighted: U.S. Pat. No. 5,709,187 Flame Arrestor patent, which consists of a enhanced flame arrestor for a marine engine that includes an air box and passing combustion air intake and uniplanar flame arresting element mounted to the air box and passing combustion air through in one first direction into the air intake and blocking flame propagation in the opposite direction out of the air intake. The main disadvantage of this patent is its specific application for air intake tubes.

WO 00/73701 patent (Swiding Flashback Arrestor) incorporates two monoliths (one acting as a mixer and the other as a flame holder) that have a plurality of channels defined by walls and are separately by a gap. The downstream monolith includes at least one channel which has a spatial orientation whereby a swirl is imparted to a fluid traversing there through. The main disadvantage of this patent is its specific application for gas turbines.

Another common characteristic observed in the current technique relating flame arrestors is the disposition between fire retaining elements and the exterior part as a labyrinth, so that fire decreases and even extinguishes in its way out.

DESCRIPTION OF THE INVENTION

Usually those compartments that contain aircrafts engines are known as hot compartments and compulsory require certain kind of refrigeration. Engine and A.P.U. compartments are covered by a composite bulkhead not only for military aircrafts, which do not have to meet fire specifications, but also for civil aircrafts, which must meet F.A.A. specification, and which incorporate refrigeration systems inside the casing.

In order to reduce the total weight of the aircraft as much as possible a flame arrestor would be made from a composite bulkhead, obviating the refrigeration system that should be included inside the engine compartments. It has to be considered that these kinds of bulkheads do not comply with any specification relating to fire protection. This way, some elements are usually incorporated on to the same composite bulkhead being used. These elements together isolate the inside and impede fire propagation toward the exterior of the compartment.

This type of barrier meets not only fire protection requirements, but also the applicable structural requirements that require bearing the weight of one operator on the mentioned bulkhead. The flame arrestor subject to the invention is part of a bulkhead that extends over the whole periphery of casing where the engine or the A.P.U. is installed. A flame arrestor that meets F.A.A. (Federal Aviation Authority) requirements on fire protection is obtained from bulkheads currently in use by changing their constituent materials and introducing other new materials with a specific disposition.

Amongst the elements mentioned, there is a metallic wire grid, circular and with thickness through holes distributed over its inner surface, which sits peripherally on a metallic plate, that is directly located onto the composite bulkhead. On the inner side if the bulkhead, another metallic plate is installed with equivalent dimensions to the outer one; This way a coating for the bulkhead is obtained, reinforcing the zone directly affected by flames. The edges of the composite bulkhead inner circle are chamfered and reinforced with a metallic flanged cylinder.

Between the bulkhead chamfered edges and the metallic flanged cylinder composed of welded disc on a cylindrical ring, there is a cavity that in case of fire acts as an insulating element for the hole edge. At the same time the cavity conducts toward the interior of the casing, any gases that may be generated inside composite, due to the temperature rise caused by the combustion. Some holes are located in the flanged cylinder that reinforces the lower side of composite bulkhead coinciding with the void zones that exist between bulkhead edges and reinforcement metallic flanged cylinder. Hot gases accumulated in void zone flow into the engine compartment out of flame arrestor and fire propagation to other adjoining units.

Besides the previously mentioned elements, a thin metallic plate, preferably Titanium, is placed parallel to the bulkhead. It has an octagonal shape and its edges rounded off toward the engine compartment. The distance established for the plate location, as well as its fastening, is carried out by using threaded bolts which, combined with their corresponding nuts, are the flame arrestor fastening systems.

From all the previously described the following advantages of the flame arrestor now invented should be highlighted: fulfillment with F.A.A. (Federal Aviation Authorities) standards regarding the bulkhead fire resistance requirements, generalization in the use of the platform in any existing aircraft engine, application simplicity of this flame arrestor constitutive elements and, finally easy conversion of existing platforms that do not meet the applicable specifications in new fire resistant platforms.

In order to make the explanation easier a drawing sheet has been attached, in which a practical case of this invention scope is represented.

DESCRIPTION OF THE PREFERRED EMBODIMENT OF THE INVENTORY

This description is focused on the practical realization in an aircraft Auxiliary Power Unit (A.P.U.), being extensible to any other compartment that should remain covered and comply with fire requirements.

Figure 1:
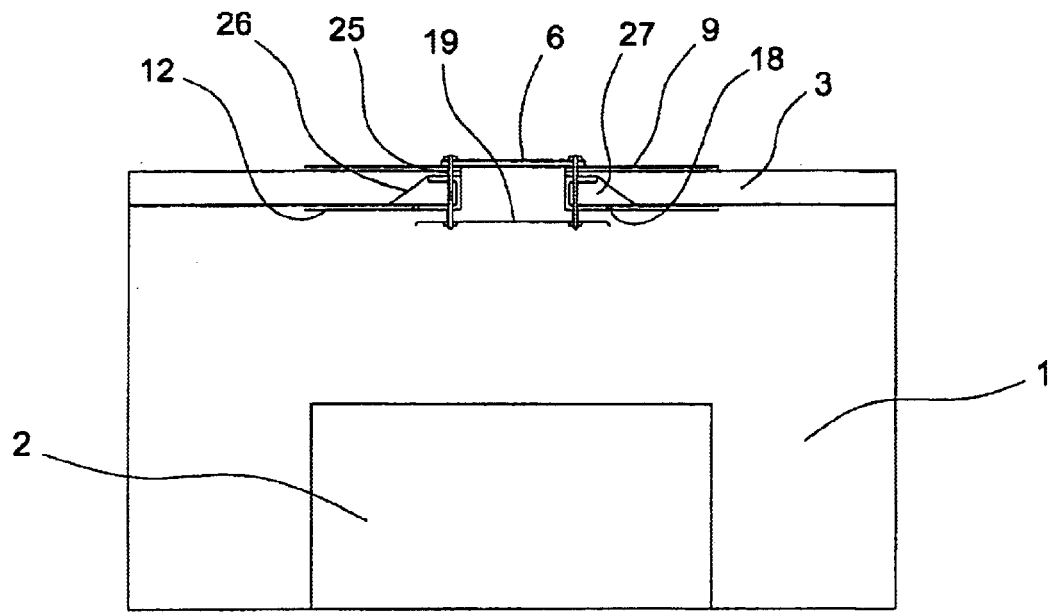
FIG. 1 is a sectional view that shows the interior of a compartment covered by the platform constitutive flame arrestor, according to a schematic view.

As shown in FIG. 1, the interior compartment (1) is made up of one casing that includes the corresponding engine (2). This compartment (1) is hermetically closed except for the upper hole, which is the ventilation point of the casing and is covered by a metallic grid (6).

Figure 2:
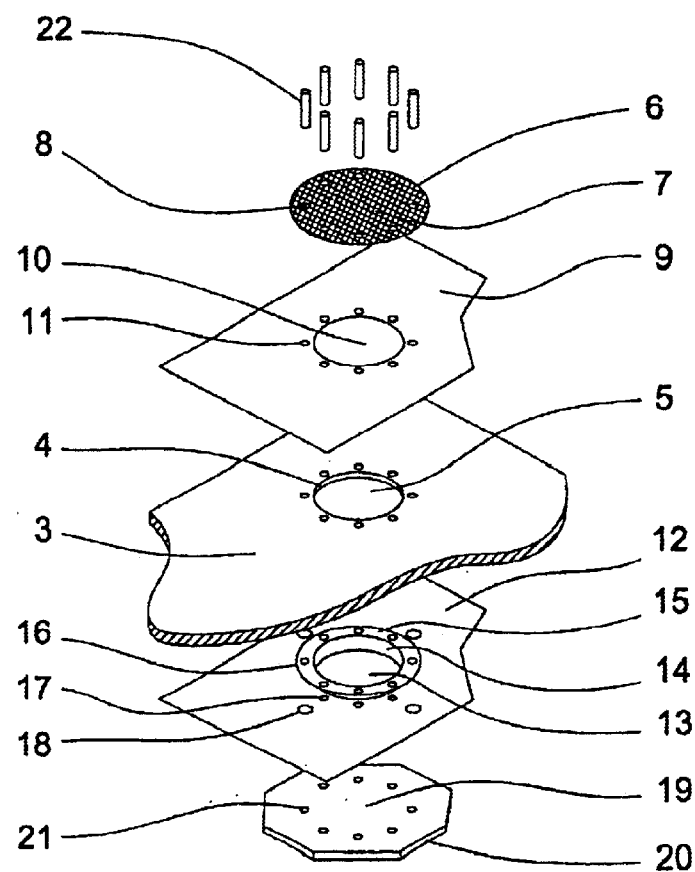
FIG. 2 is a perspective exploded view of the flame arrestor with all the elements to be assembled on the platform, located according to order and way of application.

FIG. 2 is an exploded view of new flame arrestor, where a composite material platform (3) reinforced by a variety of elements now described as shown. Starting from an intermediate element, a platform (3) with a central hole (5) and with the edges of one of his faces bevelled (4). The superior element is a grid (6), which has in its interior a wide range of thickness through holes (7) and small diameter holes (8) in the periphery. The part where the previously mentioned grid (6) is supported is a metallic plate (9) with a rectangular general configuration which has a circular hole (10) in its centre skirted by its corresponding peripheral holes (11). The two parts previously mentioned are supported onto the exterior part of the platform (3) therefore are eventually located in the exterior of the aircraft.

By the interior part of the platform (3) and being included in the interior of the compartment where the A.P.U. is located, a lower metallic plate (12) is displayed, similar in shape and size to the exterior metallic plate (9), which, also includes a circular central hole (13) skirted by a cylindrical ring (14) and toped by a disc (15) forming an external flange where the corresponding small diameter holes (16) are distributed. On the top of the cylindrical ring (14) a disc (15) is set with interior diameter equal to the diameter of the cylindrical ring (14), forming a flange cylinder. This flanged cylinder together with the lower metallic plate (12) form a unique metallic and homogeneous body. This union is carried out by welding or any other similar method. In the periphery of the cylindrical ring (14) that skirts the circular central hole (13) the corresponding holes (17) where the fastening elements go through are displayed. In the same way, another series of holes (18) are displayed, peripherally to the circular central hole (13) and symmetrically distributed in relation to the same one. At a certain distance from the lower plate (12) is located an octagonal part,(19) preferably made of Titanium, which has all its edges (20) curved toward the exterior of the flame arrestor. Uniformly distributed according to a concentric to the part centre (19) the corresponding holes (21) are displayed where the fastening elements go through (22).

Figure 3:
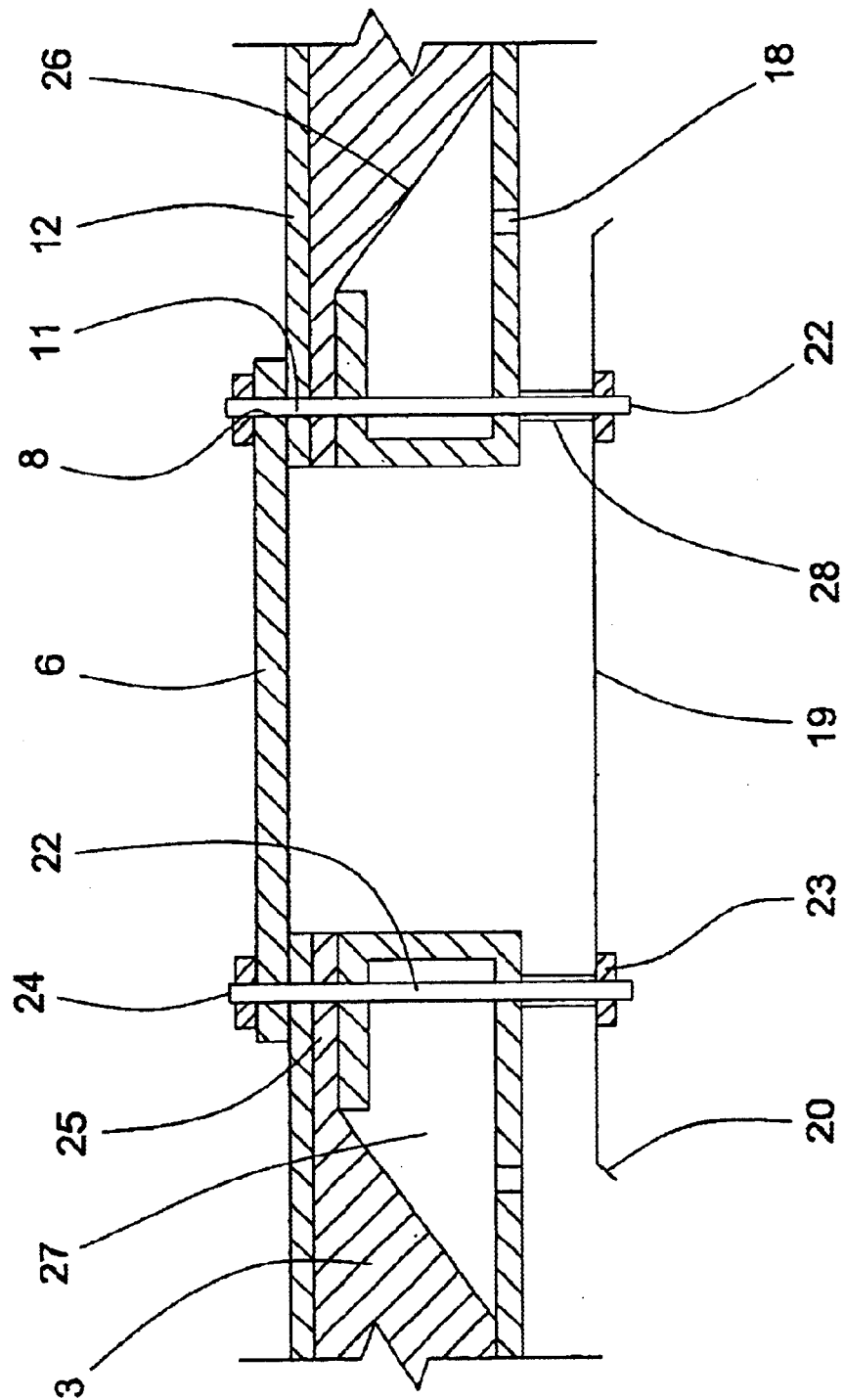
FIG. 3 is a detail from arrestor profile, where thickness and final assembly of parts are shown.

As shown in FIG. 3 according to a practical case of this invention carried out, the flame arrestor is formed by a series of metallic sheets of a rather scarce thickness and preferably made of Titanium, jointed to each other by some fastening elements, that in the practical case being described, is formed by bolts (22) threaded to its corresponding nuts (24) keeping the elements fastened to each other and separated the precise measure. Concretely for the octagonal part (19) which is located at a certain distance from the lower metallic plate (12) separating elements (28) formed by bush or spacer are being used.

The first of the elements due to assembly is the ventilation grid (6) by whose peripheral holes (8) go through the corresponding fixation elements, remaining their head (24) in the exterior surface of the grid (6). After going through the mentioned bolts (22) the holes (11) peripheral to the existing circular hole (10) The next part that the bolts (22) go through is the thin composite wall (25) with a central hole (5), existing in the composite material platform (3). The thin composite wall (25) has a chamfered (26) finish that results in a bell shaped part.

The disc (15) that formed a flange is display in the inferior part of the thin composite wall (25), coinciding in width with the cylindrical ring (14) and forming together the interior cavity (27) where gases can be accumulated without burning and in turn address/direct through the holes (18) the gases coming out the composite material itself toward the interior of the compartment (1). The height of the mentioned cylindrical ring (14) can be related to the chamfer height (26) formed in the platform (3) central hole extreme (5). The bolts (22) go through the holes (17) of the lower metallic plate (12) and display the holes (18) confronted to the interior cavity (27) formed between this conjunction of elements. After going through the lower metallic plate (12) the bolts (22) fasten the octagonal part (19) distancing both part an established measure by the separating elements (28) like bushing or spacer.

In a second practical case a reworked on the central hole existing in the composite material platform is carried out. The mentioned procedure is performed by adding composed material to the edges: firstly providing a fine sheet/wall (25) where a complementary bevelled edge is added.

What is claimed is:

1. Flame arrestor to plug the aircraft engines, which externally covers the compartment (1) wherein the previously mentioned engines (2) are located, characterized in having a range of additional elements to the composite material cover and arranged as follows:

the first element to be assembled is a grid by which is attached with bolts (22) that go through the peripheral holes (8), the heads of the bolts (24) rest on external surface of the grid (6), the second element is a metallic plate (upper) (9) with a rectangular configuration which has a circular hole (10) in its center skirted by its corresponding peripheral holes (11): the grid (6) rests on the edges of the previously mentioned circular hole (10);

the next part that the bolts (22) go through is the thin composite wall (25) with a chamfered (26) finish, that results in a bell shaped part with a hole (5) in the middle;

afterward, the cylindrical ring (14) and the disc (15) are set forming a flanged cylinder located in the inferior part of the thin composite wall (25) of the platform (3), the bolts (22) go through the small diameter holes (16) distributed on the disc (15) and subsequently the interior cavity (27) coinciding in width with the cylindrical ring (14);

subsequently, the bolts (22) go through the holes (17) of the lower metallic plate (12) and display the small diameter holes (18) confronted on the interior cavity (27) formed in the conjunction between the cylindrical ring (14) and the set disc (15), the composite material bevelled wall (26) and the lower metallic plate (12); and finally, after going through a metallic plate (lower) (12) the bolts (22) fasten the octagonal part (19) with edges (20) curved toward the exterior of the plate, distancing both parts a previously established measure by the separating elements (28).

2. Flame arrestor according to claim 1, characterized in having the edges (4) of the central hole of the platform (3) chamfered by means of providing a thin composite wall (25) where a prolongation of the chamfer (26) is added decreasing toward the thin sheet, forming a interior cavity (27) wherein the gases coming out the engine remain without burning.

3. Flame arrestor according to claim 1, characterized in having the metallic plate (9) superiorly displayed to the composite material platform (3), the lower metallic plate (12) is interiorly displayed to the platform (3) being similar in size and shape to the upper metallic plate (9).

4. Flame arrestor according to claim 1, characterized in having a flanged cylinder composed of a welded disc (15) on a cylindrical ring (14) set with the lower metallic plate (12) resulting a unique metallic and homogeneous body.

5. Flame arrestor according to claim 1, characterized because the grid (6) as well as the upper metallic plate (9) remain externally located to the platform (3), in the exterior of the aircraft.

6. Flame arrestor according to claim 1, characterized in having the upper metallic plate (9), the lower metallic plate (12) and the octagonal part (19) that reinforce against fire the mentioned flame arrestor formed by a series of metallic sheets of a rather scarce thickness and preferably made of Titanium.

* * * * *